United States Patent [19]

Coden et al.

[11] Patent Number: 5,201,018
[45] Date of Patent: Apr. 6, 1993

[54] OPTICAL CONNECTOR WITH WAVEGUIDES FOR DEVICE TO FIBER COUPLING

[75] Inventors: Michael H. Coden, New York; Dutt V. Bulusu, Yorktown Heights, both of N.Y.

[73] Assignee: Codenoll Technology Corporation, Yonkers, N.Y.

[21] Appl. No.: 751,937

[22] Filed: Aug. 29, 1991

[51] Int. Cl.$^5$ .............................................. G02B 6/42
[52] U.S. Cl. ...................................... 385/88; 385/92; 385/94
[58] Field of Search ................ 385/88, 92, 94, 89, 385/90, 91, 93

[56] References Cited

U.S. PATENT DOCUMENTS 4,515,434  5/1985  Margolin et al. ................. 385/88 X
4,772,081  9/1988  Borgos et al. ..................... 385/92 X
4,875,755  10/1989  Borgos et al. ..................... 385/78

*Primary Examiner*—John D. Lee
*Assistant Examiner*—Phan Thi Heartney
*Attorney, Agent, or Firm*—Pennie & Edmonds

[57] ABSTRACT

An optical connector for device to fiber coupling is disclosed comprising a connector housing having waveguide channels formed therethrough. The connector housing is injection molded from a plastic material. These waveguide channels each include a first end and a second end. Attachment apparatus for an optical fiber is included at each of the first ends of the waveguide channels, and attachment apparatus for an optical device is included at each of the second ends of the waveguide channels. Waveguide core portions, positioned within the waveguide channels, are made from an optical plastic material.

12 Claims, 2 Drawing Sheets

OPTICAL CONNECTOR WITH WAVEGUIDES FOR DEVICE TO FIBER COUPLING

BACKGROUND OF THE INVENTION

The invention relates to optical connectors for coupling optical fibers to opto-electronic devices, and more particularly to injection molded connectors.

Data transmission over optical fibers offers many significant advantages over metallic conductors including: long distance transmission without the need for repeaters, immunity from external electromagnetic interference, cross-talk and ground loop, high bandwidth capabilities, small size and weight, high degree of intercept security and dielectric isolation, and long term cost reduction. These desirable features of optical fiber technology have strongly stimulated efforts both in fiber optics and in supporting technologies such as optical fiber to optical device connectors.

Optical fiber connections to opto-electronic devices have often employed adhesive means such as epoxy to secure a fiber end directly to an optoelectronic device. Illustrative devices include an optical source and/or an optical detector. The connectors typically include a ferrule or the like adapted for fiber insertion therein. Another fiber to device connection comprises an optical lens such as a spherical lens or a graded refractive index (GRIN) lens positioned between the device and the end of the fiber to improve the coupling efficiency. The fiber end is typically secured in the ferrule to aid in its positioning. Some devices include the lens within the device housing and therefore do not need additional optical equipment between the fiber and device.

The above-described means for connecting an optical fiber to an opto-electronic device require active alignment of the fiber to the device to ensure proper light transmission and minimal loss due to the coupling. Active alignment may include the steps of: performing a preliminary alignment of the fiber and the device in both the axial and radial directions, performing transmission tests between the fiber and device to determine power transmission characteristics and coupling efficiency, and varying the relative orientation between fiber and device in both the axial and radial directions to maximize power transmission and coupling efficiency. After alignment, the fiber is first secured by an adhesive means such as epoxy or optical glue, followed by a curing step to set the epoxy, and then followed by a burn-in process to identify substandard connections. This procedure is time-consuming as well as inaccurate, and requires a second alignment test to ensure proper alignment in the event that small disturbances adversely affected the initial alignment.

It is advantageous to couple a duplex fiber cable to both a source and a detector. A duplex fiber cable includes two optical fibers, each surrounded by appropriate cladding and shielding necessary to eliminate light and/or electromagnetic interference or noise transmission from one fiber to the neighboring fiber. Typically, one of such fibers operates as an output transmission line and is connected to a source, while the other operates as an input transmission line and is connected to a detector. In such a duplex case, active alignment must be performed between one of the two fibers in the duplex fiber cable and the source, and also between the other fiber in the duplex fiber cable and the detector, thus resulting in an even greater possibility of misalignment and lower coupling efficiency.

Additionally, the source and detector are typically positioned directly adjacent one another to accommodate the close proximity of the fibers in the duplex fiber cable. Optical fibers in a standard duplex fiber cable are separated by 2-3 mm. The relative close positioning of source and detector in conventional devices creates a significant electromagnetic interference problem between the two devices because the source emits a level of electromagnetic energy that is significantly greater than the level of electromagnetic energy typically received by the detector. This problem worsens as the data transmission rate is increased. Additionally, the close proximity of the two fibers in the vicinity of the devices can create additional electromagnetic interference.

SUMMARY OF THE INVENTION

The object of this invention is to provide an optical connector for connecting optical fibers to opto-electronic devices, and specifically for connecting optical duplex fiber cables to both a source and a detector.

According to this invention, the connector comprises an optical waveguide device which, in essence, acts as an extension of the optical fibers. An optical waveguide includes an inner core material suitable for efficient transmission of light and an outer cladding portion which prevents much of the light from escaping from the core material, and hence minimizes transmission losses.

The waveguide connector of the invention comprises a connector housing portion and a core portion and is made from a block or blocks of a suitable optical plastic, similar to those used in optical fiber technology. The plastic block is preferably injection molded to form a connector housing including an input fiber port, an output fiber port, two channels adapted to receive core portions of the waveguide, a source connection port suitable for connection to a source, and a detector connection port suitable for connection to a detector. The housing is made from a plastic having an index of refraction which is lower than that of the core material, and acts as a cladding material to the core. Alternatively, the channels may be coated with a suitable cladding material, thus enabling the use of any injection-moldable material for the block. The index of refraction of the core material is chosen so as to be compatible with the index of refraction of a core of the optical fiber to which it is to couple. The input and output fiber ports are shaped to readily mate with the duplex fiber cables, thereby facilitating coupling. Similarly, the connection ports to the optical devices are shaped to mate directly with such devices as described above.

Advantages of the invention include integrated alignment means (i.e., the fiber ports and device ports) which eliminate the problems associated with active alignment, as well as the need for exterior attachment means such as adhesive material (i.e., epoxy or optical glue). The alignment means built into the connector increases the coupling efficiency of the fiber optic system. Because the connector is made using injection molding techniques, it is cheaper and easier to manufacture than conventional connectors which require expensive optical equipment such as lenses. Further, the connector allows for a greater separation of source and detector as well as separation of the two fibers in a duplex embodiment, which greatly reduces the electromagnetic interference in the device.

BRIEF DESCRIPTION OF THE DRAWINGS

These and other objects, features and advantages of the present invention will be more readily apparent from the following detailed description in which.

DETAILED DESCRIPTION OF THE INVENTION

Figure 1:
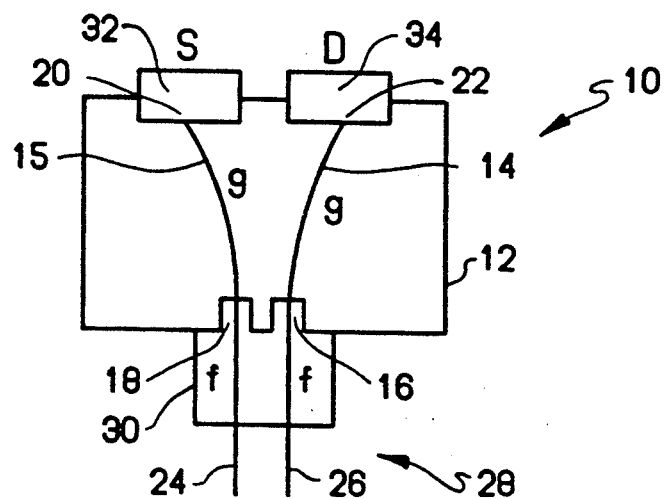
FIG. 1 is a diagrammatic illustration of a cross-sectional view of an optical connector of the invention.

FIG. 1 illustrates an optical connector 10 including a connector housing 12, two channels 14, 15 each of which defines a waveguide core, an input fiber port 16, an output fiber port 18, a connection port 20 adapted to mate with a source, and a connection port 22 adapted to mate with a detector.

The connector housing 12 is made from an optical plastic material suitable for injection molding such as, for example, fluorinated polymethylmethacrylate (PMMA). Input port 16, output port 18, and connection ports 20, 22 are formed as integral parts of housing 12 during the injection molding process. The channels 14, 15 are filled with an optical plastic having an index of refraction which corresponds to the index of refraction of the core of the optical fibers attached thereto, and which is greater than the index of refraction of the material comprising the connector housing. For example, the waveguide core portions may be constructed from pure polymethylmethacrylate (PMMA). Accordingly, the waveguide channels 14, 15 filled with the plastic material function as the core portions of the waveguide and the connector housing 12 functions as the cladding material. Alternatively, the channels may be coated with a suitable cladding material. Thus, light propagated in the core material is confined and guided by the cladding material.

Optical fibers 24, 26 are contained within a duplex fiber cable 28. As is known in the art, a core of each fiber is surrounded by suitable cladding material to prevent light from escaping the core. In a plastic fiber embodiment, the core of the fiber comprises a plastic material illustratively measuring 1 mm in diameter having a cladding measuring 10 microns in thickness. The individual fibers in this duplex plastic fiber embodiment are positioned approximately 2-3 mm apart in the cable. Similarly, in a glass fiber embodiment, the core of the fiber comprises a glass material illustratively measuring 50-100 microns in diameter and having a cladding measuring 125-140 in outside diameter. In this embodiment, the individual fibers in the duplex arrangement are positioned approximately 2 mm apart in the cable. The end of fiber cable 28 includes a fiber connector used to facilitate attachment of cable 28 to connector housing 12 by way of fiber ports 16, 18. Known glass fiber connectors include SMA canister connectors which screw onto attachment ports 16, 18 and bayonet connectors with appropriate slots which are first inserted into the ports and then turned for additional securement with protruding pins that are part of ports 16 and/or 18. As will be appreciated, a variety of port configurations may be employed and integrally formed with the housing during the injection molding process. Advantageously, ports 16, 18 are formed during the molding process so as to mate with the corresponding fiber connector, and therefore machining is not required.

Optical devices used for receiving and transmitting light through the fiber-optic system are attached to the connector housing on ends of waveguide channels 14, 15 at a side of the housing opposite from the fiber connector. Optical devices include sources 32 (i.e., light emitting diodes) and detectors 34 (i.e., PIN diodes, avalanche photodiodes, or the like). The devices 32, 34 are typically connected to the connector housing using a snap-on design feature. Because the waveguide channels are designed to appropriately interface, in size and in shape, with the devices supplying or receiving light, active alignment is not required to prevent coupling losses. The connection ports 20, 22 of the connector housing 12 are molded to mate either directly with the device or with the corresponding device connectors.

Because the connection ports are maintained integral with the connector housing, the optical devices are easily "connected" to the fibers without the need for active alignment. Hence, light signals propagate from optical fiber 26 through waveguide channel 14 and into detector 34 without significant losses. Similar)y, there is efficient light transmission from source 32 through waveguide channel 15 and into optical fiber 24. Source 32 and detector 34 may be connected to a variety of processing means (not shown).

The optical connector 10 has a cross- o sectional area of approximately 1 cm × 1 cm on its face, as measured in a plane which cuts through the connector generally perpendicular to each of the waveguide channels. The diameter of the waveguide channels is determined by the material and size of the fiber connected thereto. The index of refraction of the core of the waveguide should match the index of refraction of the core of the fiber. Advantageously, a plastic optical waveguide core may be employed with glass or plastic optical fibers as long as the waveguide core has a suitable diameter and index of refraction. For example, a glass fiber having a diameter of 50-200 microns may be employed with a plastic waveguide core having a diameter of 50-200 or larger. Similarly, if the fiber is made from an optical plastic such as polymethylmethacrylate (PMMA), the core of the waveguide should correspond to the refractive index of the plastic. A plastic fiber having a diameter of 1 mm may be employed with a waveguide core of PMMA having a diameter of 1 mm or larger. Of course, the fiber material is selected to correspond to the light frequencies to be transmitted through it.

The optical connector housing 12 is manufactured as follows. A suitable plastic material is selected which has an appropriate index of refraction. This material acts as cladding material to the core portions. The plastic material is placed in a standard injection molding apparatus wherein it is formed into a unitary connector housing shape including input and output ports 16, 18 for connection to the fiber cable and ports 20, 22 for connection to the opto-electronic devices. Channels 14, 15 are initially formed as hollow cylindrical tubes of an appropriate diameter to accommodate the core material. Alternatively, the housing can be formed from a moldable plastic without any optical properties. In this case, the waveguide channels are coated with a suitable cladding material after the injection molding process.

After the injection molding process is complete, a core material (illustratively an optical plastic) is forced into the waveguide channels 14, 15. Such a core has a refractive index corresponding to the refractive index of the fiber to be used and greater than that of the housing plastic material or other cladding material. If the core is formed of a plastic material, it can be injected directly into the connector housing.

Figure 2:
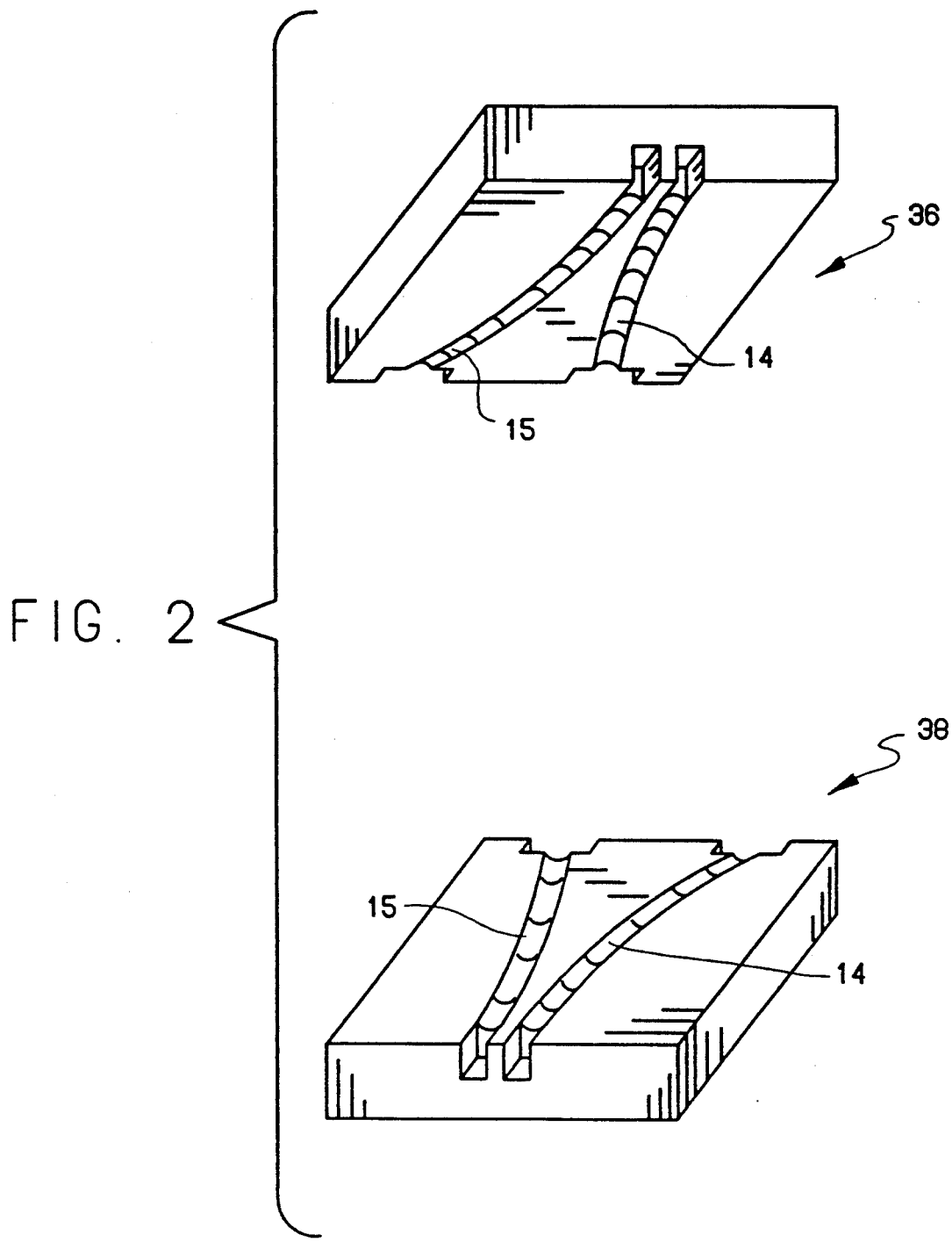
FIG. 2 is a perspective view of top and bottom halves of the optical connector of FIG. 1.

Alternately, the connector housing can be molded in two distinct pieces, illustrated in FIG. 2, comprising a top half 36 and a bottom half 38, wherein the housing is divided through the center of the thickness of the channels 14, 15 to form the halves. In this embodiment, the waveguide core material can be sandwiched between the two housing pieces. The two pieces can then be mated with one another with a snapon locking mechanism. While the embodiment depicted in FIG. 2 depicts semi-circular channels in each of the top and bottom halves, alternative embodiments may employ rectangular, trapezoidal or other channels formed entirely in one half, with the other half having a flush mating surface.

Figure 3:
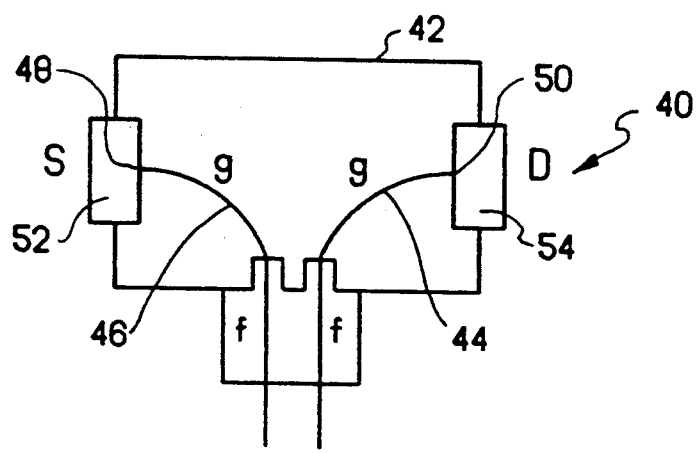
FIG. 3 is a diagrammatic illustration of a cross-sectional view of an alternate embodiment of an optical connector.

FIG. 3 illustrates an alternate embodiment of an optical connector 40 in accordance with the invention. Similar to the above-described embodiment, optical connector 40 comprises a connector housing 42 constructed from an optical plastic and two waveguide core channels 44, 46 filled with a core material, illustratively a plastic material having a higher index of refraction than that of the plastic material of the connector housing 42. Again, the connector housing includes an input port and an output port which are adapted to mate with the duplex fiber cable described above. Similarly, connection port 48 is adapted to mate with a source 52 and connection port 50 is adapted to mate with a detector 54.

However, in this embodiment the source connection port and the detector connection port are positioned opposite one another in the connector housing. In this case, these devices are separated by the entire width of the connector housing (i.e., approximately 1 cm). The optical connector of FIG. 3 can be manufactured by the same injection molding methods described with respect to FIG. 1.

While it is apparent that the invention herein disclosed fulfills the objects above stated, it will be appreciated that numerous embodiments and modifications may be devised by those skilled in the art, and it is intended that the appended claims cover all such modifications and embodiments as fall within the true spirit and scope of the present invention.

What is claimed is:

1. An optical connector for device to fiber coupling comprising:
   a. a connector housing constructed from a plastic material having two waveguide channels formed therethrough, said waveguide channels each including a first end and a second end,
      i. means for attaching an optical fiber at each of said first ends of said waveguide channels, and
      ii. means for attaching optical devices comprising an optical source and an optical detector to said connector housing wherein said optical source attaches to one of said second ends of said waveguide channels and said optical detector attaches to the other of said second ends of said waveguide channels, said second ends being separated by a distance greater than the distance between said optical fibers; and
   b. waveguide core portions positioned within said waveguide channels, said waveguide core portions comprising an optical plastic material having an index of refraction and being formed to correspond in shape to said waveguide channels.

2. The optical connector of claim 1 wherein said means for attaching said optical fibers and said means for attaching said optical devices are integrally formed with said connector housing.

3. The optical connector of claim 1 wherein said connector housing is formed from an optical plastic material having a lower index of refraction than the index of refraction of said waveguide core portions, said connector housing acting as a cladding material to said waveguide core portions.

4. The optical connector of claim 1 wherein said waveguide channels are coated with a material having a lower index of refraction than said waveguide core portions, said material acting as a cladding material to said waveguide core portions.

5. The optical connector of claim 1 wherein said means for attaching said optical source and said means for attaching said optical detector are positioned on a same side of said connector housing.

6. The optical connector of claim 1 wherein said means for attaching said optical source and said means for attaching said optical detector are positioned on opposite sides of said connector housing.

7. The optical connector of claim 1 wherein said means for attaching said optical fiber is formed to mate with a duplex optical fiber cable.

8. The optical connector of claim 1 wherein waveguide channels diverge from said first ends of said waveguide channels to said second ends of said waveguide channels.

9. The optical connector of claim 1 wherein the connector housing is constructed from fluorinated polymethylmethacrylate (PMMA).

10. The optical connector of claim 1 wherein the waveguide core portions are constructed from pure polymethylmethacrylate (PMMA).

11. The optical connector of claim 1 wherein said waveguide core portions comprise an optical plastic material having an index of refraction corresponding to the index of refraction of the cores of said optical fibers.

12. An improvement in an interface between a duplex optical fiber cable and optical devices wherein said duplex optical fiber cable comprises two transmission lines including an input transmission line and an output transmission line, and cladding material surrounding each of said lines to prevent transmission losses, and said optical devices comprise an optical source and an optical detector, said interface being arranged so that light transmits through said input transmission line toward said optical detector and from said optical source to said output transmission line;

the improvement comprising a connector having a connector housing constructed from a plastic material, said connector housing defining two waveguide channels formed therethrough and including means for attaching one line of said two transmission lines of said duplex optical fiber cable to one end of one of said waveguide channels in said connector housing and the other of said two transmission lines of said duplex optical fiber cable to one end of the other of said waveguide channels, and means for attaching said source to an opposite end of said one waveguide channel in said connector housing and said detector to an opposite end of said other waveguide channel in said connector housing, and waveguide core portions utilized to transmit light through said connector constructed of an optical plastic material and positioned within said waveguide channels.

* * * * *